United States Patent
Shumway et al.

(10) Patent No.: US 11,492,532 B2
(45) Date of Patent: Nov. 8, 2022

(54) STABLE EMULSION DRILLING FLUIDS

(71) Applicant: Halliburton Energy Services, Inc., Houston, TX (US)

(72) Inventors: William Walter Shumway, Spring, TX (US); Jeffrey J. Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/630,559

(22) PCT Filed: Sep. 29, 2017

(86) PCT No.: PCT/US2017/054369
§ 371 (c)(1),
(2) Date: Jan. 13, 2020

(87) PCT Pub. No.: WO2019/066913
PCT Pub. Date: Apr. 4, 2019

(65) Prior Publication Data
US 2021/0087456 A1 Mar. 25, 2021

(51) Int. Cl.
*C09K 8/26* (2006.01)
*C09K 8/28* (2006.01)

(52) U.S. Cl.
CPC ...................... *C09K 8/28* (2013.01)

(58) Field of Classification Search
CPC ............... C09K 8/28; C09K 8/36; C09K 8/26
See application file for complete search history.

(56) References Cited

U.S. PATENT DOCUMENTS

| 4,468,334 A | 8/1984 | Cox et al. | |
|---|---|---|---|
| 9,410,071 B1* | 8/2016 | Jiang | C09K 8/32 |
| 2003/0217866 A1* | 11/2003 | deBoer | E21B 21/06 |
| | | | 175/66 |
| 2008/0194433 A1* | 8/2008 | Tehrani | C09K 8/36 |
| | | | 507/219 |
| 2012/0181029 A1 | 7/2012 | Saini et al. | |
| 2012/0264657 A1* | 10/2012 | van Zanten | C09K 8/28 |
| | | | 507/112 |
| 2016/0145487 A1* | 5/2016 | Alam | C09K 8/74 |
| | | | 507/209 |

FOREIGN PATENT DOCUMENTS

| CN | 102504773 | 6/2012 |
|---|---|---|
| EP | 2451887 | 4/2014 |
| WO | 2014052510 | 4/2014 |
| WO | 2014179330 | 11/2014 |
| WO | WO 2014/179330 | * 11/2014 |

OTHER PUBLICATIONS

Product data sheet https://ovgroup.en.ecplaza.net/products/ organophilic-clay-vg-69-vg-69_3752573 downloaded on Jun. 30, 2021.*
AAPG Wiki (https://wiki.aapg. org/ Drilling_a_well downloaded on Nov. 29, 2021).*
ISRWO International Search Report and Written Opinion for PCT/US2017/054369 dated Jun. 14, 2018.
Van Zanten, R., Miller, J. J., & Baker, C. (2012) Improved Stability of Invert Emulsion Fluids. IADC/SPE Drilling Conference and Exhibition. SPE 151404.
Great Britain Examination Report for Application No. GB2001541. 8, dated Nov. 30, 2021.

* cited by examiner

*Primary Examiner* — Kumar R Bhushan
(74) *Attorney, Agent, or Firm* — Tenley Krueger; C. Tumey Law Group PLLC

(57) ABSTRACT

A method of reducing a density of a density of a stable emulsion drilling fluid may comprise providing a stable emulsion drilling fluid comprising: an aqueous liquid; a biopolymer; an emulsifier; solid particulates; and an oil; wherein the stable emulsion drilling fluid is capable of remaining in quiescent storage at approximately 70° F. and atmospheric pressure without phase separation for about 8 hours or longer; circulating the stable emulsion drilling fluid though a drill string and annulus; adding additional oil to the stable emulsion drilling fluid to decrease the density of the stable emulsion drilling fluid and produce a reduced density stable emulsion drilling fluid; and circulating the reduced density stable emulsion drilling fluid though the drill string and the annulus.

19 Claims, 2 Drawing Sheets

STABLE EMULSION DRILLING FLUIDS

BACKGROUND

During the drilling of a wellbore into a subterranean formation, a drilling fluid, also referred to as a drilling mud, may be continuously circulated from the surface down to the bottom of the wellbore being drilled and back to the surface again. Among other functions, the drilling fluid may serve to transport wellbore cuttings up to the surface, cool the drill bit, and provide hydrostatic pressure on the walls of the drilled wellbore. Drilling fluid density may be an important factor to monitor during drilling operations as the hydrostatic pressure exerted by the drilling fluid is directly proportional to the density of the drilling fluid. Hydrostatic pressure should increase with increasing density of the drilling fluid and height of fluid column. Excess hydrostatic pressure above the fracture gradient of the formation may lead to premature fracturing of the formation and resultant formation damage and fluid loss.

To remedy these and other issues, lower density drilling fluids may be required. Oil may be added to a drilling fluid to reduce the density but these systems may not be stable at static conditions. Furthermore, these systems may become increasingly unstable at high salinity such as in brine based drilling fluids

BRIEF DESCRIPTION OF THE DRAWINGS

These drawings illustrate certain aspects of some examples of the present invention, and should not be used to limit or define the invention.

DETAILED DESCRIPTION

Figure 1:
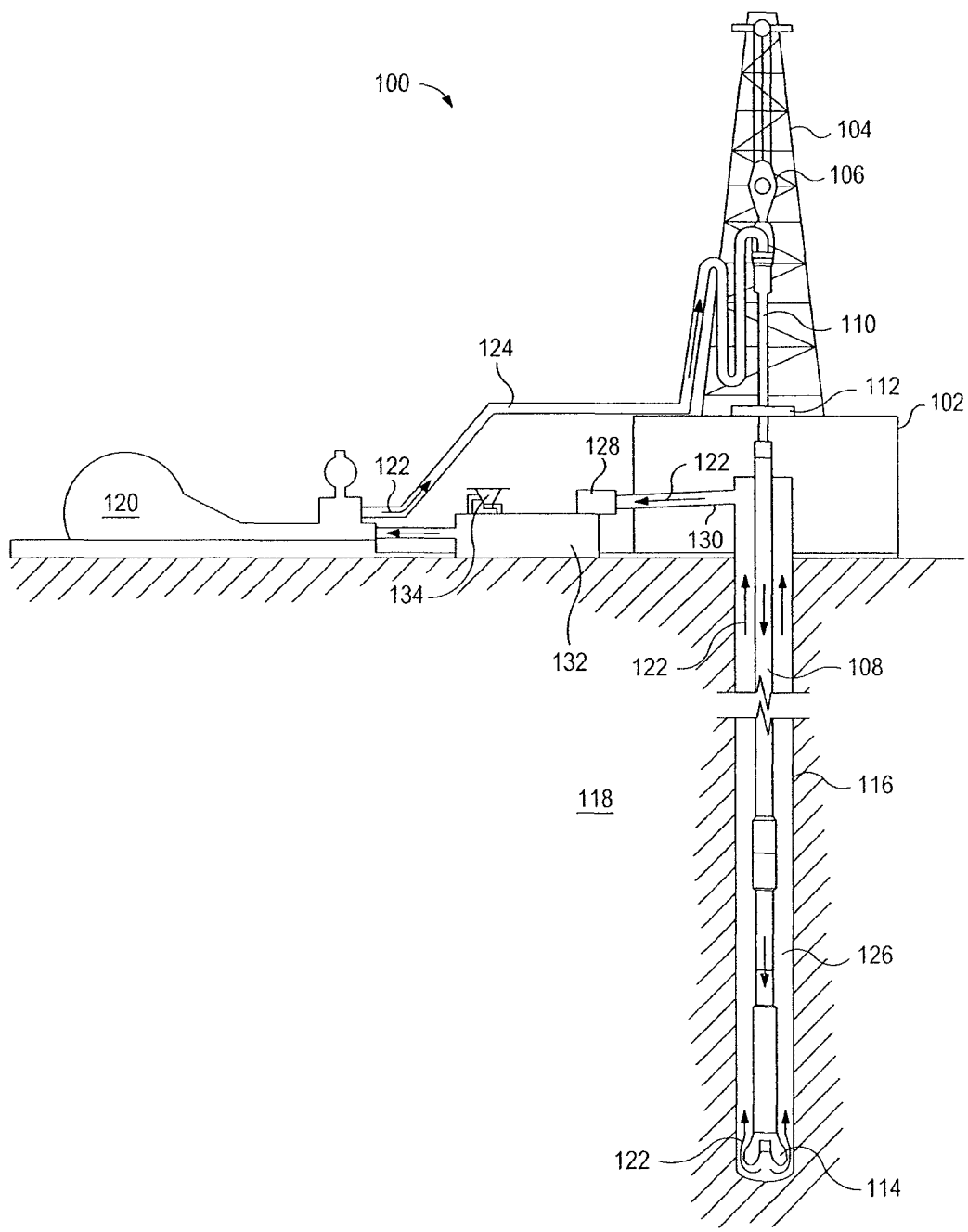
FIG. 1 is a schematic diagram of an example drilling assembly.

As previously discussed, there may be challenges in drilling and extending a wellbore though certain subterranean formations. In some structurally weaker formations, formations that include a higher salt or other dissolvable species content, unconsolidated formations, and formations with a relatively low fracture gradient, conventional drilling fluids may damage the wellbore and subterranean formation. Damage to the formation may include any range of damage from small amounts of washout or removal of wellbore surface material beyond the size of the drill bit up to and including wellbore collapse. A particular challenge in drilling a subterranean formation including a high amount of water soluble species is that a water based drilling fluid may solvate the soluble species and remove them from the formation and wellbore surface. The water soluble species may then be moved from the wellbore as the drilling fluid flows back up the annulus. In applications such as drilling though a salt dome, a saturated brine based drilling fluid may be used to minimize the amount of salt removed. In some salt dome drilling applications, the only safe way to drill is with a saturated brine fluid.

Drilling with a saturated brine can present other challenges such as increased density of the drilling fluid. A relatively higher density drilling fluid may prematurely fracture the subterranean formation due to the higher hydrostatic pressure associated with denser fluids. Additionally, relatively denser fluids may require a higher horsepower to pump than relatively less dense fluids. Additional horsepower may become cost prohibitive at higher volumetric flow rates. In some conventional drilling operations, water may be added to a drilling fluid to decrease the density. In applications where a saturated brine is required, the density typically cannot be decreased with water as then the brine would not remain saturated. In such applications, an oil may be used to reduce the density. Such oil and water systems tend to stratify rapidly, even when an emulsifier is used. Such systems may need to be pumped at high velocities so that turbulent mixing keeps the oil and water emulsified. High velocities again may require high horsepower requirements and may lead to a variety of other adverse conditions such as jetting from the drill head which may damage the formation. Additionally, the oil in water emulsion drilling fluids are typically continuously agitated at the surface or phase separation may occur. As such, these systems may generally not be well suited for storing for an extended period of time.

Provided are compositions, systems, and methods for a stable emulsion drilling fluid. More particularly, compositions, systems, and methods may be provided for an oil in water or water in oil emulsion based drilling fluid with reduced wellbore washout in salt bearing subterranean formations. The oil and water emulsion may comprise a continuous aqueous phase with a dispersed oil phase therein or a continuous oil phase with a dispersed aqueous phase therein. One of ordinary skill in the art would recognize the benefits of an oil in water or water in oil emulsion for a particular application and be able to select an appropriate emulsion for a particular application. The stable emulsion drilling fluid may be characterized as being capable of being stored for extended periods of time in quiescent storage at room temperature (approx. 70° F. (21° C.)) and atmospheric pressure, for example, about 24 hours or longer, with minimal phase separation. Quiescent storage may be defined as storage without additional mixing during the storage period. Minimal phase separation is defined as less than about 5% by volume breakout of either the continuous or discontinuous phase, or as a combination of the two phases. Breakout may be observed as a stratified layer of fluid that is separate from the bulk emulsion. In another example, the stable emulsion drilling fluid may remain in a fluid state without layer stratification for about one day or longer, about three days or longer, or about one week or longer in quiescent storage, for example at about 100° F. The stable emulsion drilling fluid may include an aqueous liquid, an oil, an emulsifier, a viscosifying bio-polymer, and a sized solid material.

The stable emulsion drilling fluids may include an aqueous liquid. The stable emulsion drilling fluids may be characterized as aqueous continuous. The aqueous liquid may be from any source provided that it does not contain an excess of compounds that may undesirably affect other components in the drilling fluids. For example, a drilling fluid may include fresh water or salt water. Salt water generally may include one or more dissolved salts therein and may be saturated or unsaturated as desired for a particular application. Seawater or brines may be suitable for use in some examples. Further, the aqueous liquid may be present in the stable emulsion drilling fluid in any amount. In some examples, without limitation, the aqueous liquid may be present in the drilling fluids in an amount in the range of from about 30% to about 100% by weight of the drilling fluids. Alternatively, about 30% to about 40% by weight, about 40% to about 50% by weight, about 50% to about 60% by weight, about 60% to about 70% by weight, about 70% to about 80% by weight, about 80% to about 90% by weight, or about 90% to about 100% by weight. One of ordinary skill in the art with the benefit of this disclosure will recognize the appropriate amount of salt and aqueous liquid for a chosen application.

As previously described, one or more dissolved salts may also be present in the aqueous liquid. Where used, the dissolved salt may be included in the aqueous liquid for any purpose, including, but not limited to, densifying a drilling fluid including water to a chosen density. A mixture of one or more dissolved salts and water may be used in some instances. The amount of salt that should be added may be the amount needed to provide a desired density. One or more salts may be added to the water to provide a brine that includes the dissolved salt and the water. Suitable dissolved salts may include monovalent (group I) and divalent salts (group II). Mixtures of monovalent, divalent, and trivalent salts may also be used. Suitable salts may include, but are not limited to, sodium chloride, sodium bromide, potassium bromide, potassium chloride, potassium formate, cesium formate, lithium chloride, lithium bromide sodium formate, lithium formate, ammonium chloride, organic cation salts such as tetramethyl ammonium chloride, choline chloride, and mixtures thereof among others. The salt may be provided in any amount or concentration such as unsaturated, saturated, supersaturated, and saturated with additional solids. For example, the salt may be provided in an amount in a range of about 1% to about 50% by weight of the stable emulsion drilling fluid. Alternatively, about 1% to about 5% by weight, about 5% to about 10% by weight, about 10% to about 15% by weight, about 15% to about 20% by weight, about 20% to about 25% by weight, about 25% to about 30% by weight, about 30% to about 35% by weight, about 35% to about 40% by weight, about 40% to about 45% by weight, about 45% to about 50% by weight, or about 10% to about 30% by weight.

Those of ordinary skill in the art will appreciate that the stable emulsion drilling fluid generally should have a density suitable for a particular application. By way of example, the stable emulsion drilling fluid may have a density in the range of from about 7 pounds per gallon ("lb/gal") (838.8 kg/m$^3$) to about 20 lb/gal (2397 kg/m$^3$). In certain embodiments, the set-delayed cement compositions may have a density in the range of from about 8 lb/gal (958.6 kg/m$^3$) to about 12 lb/gal (1438 kg/m$^3$). Embodiments of the stable emulsion drilling fluid may include other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

The stable emulsion drilling fluids may include an oil. The oil may be any suitable oil such as an alkane, an alkene, an alkyne, an aromatic, a tall oil, crude oil, light cycle oil, synthetic ester oils, diesel, synthetic oils, refined oils, vegetable oils, and combinations thereof. The oil may be present in the stable emulsion drilling fluid in an amount of about 1% by weight to about 99% by weight. As previously described, the oil may be used to reduce the density of the stable emulsion drilling fluid and in particular, stable emulsion drilling fluids including a saturated brine. In embodiments, the oil may be provided in any suitable amount to reduce the density of the stable emulsion drilling fluid to a selected density. For example, the oil may be present in the stable emulsion drilling fluid in a range of from about 1% to about 5% by weight, about 5% to about 10% by weight, about 10% to about 15% by weight, about 15% to about 20% by weight, about 20% to about 25% by weight, about 25% to about 30% by weight, about 30% to about 35% by weight, about 35% to about 40% by weight, about 40% to about 45% by weight. 45% to about 50% by weight, about 50% to about 70% by weight, about 70% to about 90% by weight, or about 90% to about 99% by weight.

As previously mentioned, the stable emulsion drilling fluid density may be adjusted by addition of oil or reduction of the volume aqueous components in the stable emulsion drilling fluid. In some examples, the density of a stable emulsion drilling fluid may be reduced by about 1% to about 40% by the addition of oil. Alternatively, about 1% to about 10%, about 10% to about 20%, about 20% to about 30%, or about 30% to about 40%. In another example, the density may be reduced by about 1% to about 30%.

The stable emulsion drilling fluids may include a surfactant such as an emulsifier. The emulsifier may include, without limitation, fatty amines, ethoxylated nonylphenols, fatty acids, fatty acid esters, and combinations thereof. In general, any surfactants with a Griffin's HLB (hydrophilic-lipophilic balance) of about 9 or greater may be used. Fatty acids and fatty acid esters may be of particular interest as they are generally non-hazardous to the working environment and may pose little environmental risk.

The Griffin's HLB values may be calculated by the following formula:

$$HLB = 20 * \frac{M_h}{M}$$

where $M_h$ is the molecular mass of the hydrophilic portion of the molecule and M is the molecular mass of the whole molecule. One of ordinary skill in the art with the benefit of this disclosure should be able to determine if a particular emulsifier includes a Davies HLB value of greater than about 9.

One of ordinary skill will appreciate that the emulsifier may be present in any amount suitable for a particular application. In some examples, without limitation, the emulsifier may be present in the stable emulsion drilling fluid in an amount in a range of about 0.5% to about 10% by weight of the stable emulsion drilling fluid. Alternatively, about 0.5% to about 1% by weight, about 1% to about 1.5%, about 1.5% to about 2%, about 2% to about 2.5%, about 2.5% to about 3%, about 3% to about 15%, about 3.5% to about 5%, about 3% to about 5%, about 5% to about 7%, about 7% to about 9%, about 9% to about 10%, or about 1% to about 5%.

The stable emulsion drilling fluids may include a viscosifying biopolymer. A viscosifying biopolymer may comprise a polymer produced by a living organism and synthetic derivatives thereof. Viscosifying biopolymers may include any suitable biopolymer such as, without limitation, xanthan gum, welan gum, guar gum, hydroxyethyl cellulose, hydroxy-propyl guar, carboxy-methyl-hydroxy-propyl guar, starches and modified polysaccharides, (partially-hydrolyzed polyacrylamide) PHPA, diutan gum, scleroglucan, carboxy-methyl-cellulose, polyanionic cellulose, galactomannan gum, cellulose, starch, chitosan, collagen, gelatin, agarose, chitin, polyaspartic acid, pectin, dextran, gum arabica, alginate, carrageenan, polylactide, poly-caprolactone, polyglycolide, polyhydroxybutyrate, lignin, lignosulfonates, derivatives thereof, and combinations thereof. The viscosifying biopolymer may be provided in any amount suitable for a particular application. For example, without limitation, the viscosifying biopolymer may be present in the stable emulsion drilling fluid in an amount in a range of about 0.1% to about 5% by weight of the stable emulsion drilling fluid. Alternatively, about 0.1% to about 0.5% by weight, about 0.5% to about 1% by weight, about 1% to about 2% by weight, about 2% to about 3% by weight, or about 3% to about 5% by weight.

The stable emulsion drilling fluids may include a sized solid particulate. Sized solids may include, without limitation, sepiolite, attapulgite, calcium bentonite, sodium bentonite, calcium montromillonite, organoclays, and combinations thereof. Organoclays are organically modified phyllosilicate formed by exchanging interlayer cations for alkylamonium or phosphonium ions. The term sized solids or sized solid particulates means solid particulates that have been sorted based on a mean particle size to include or exclude particulates of a selected range. The sized solids may include any particle size distribution as desired for a particular application. In certain embodiments, the sized solids may have a mean particle size in a range of from about 1 micron to about 200 microns as defined by ASTM methods. The mean particle size corresponds to d50 values as measured by particle size analyzers such as those manufactured by Malvern Instruments, Worcestershire, United Kingdom. In specific embodiments, the sized solids may have a mean particle size in a range of from about 1 micron to about 200 microns, from about 5 microns to about 100 microns, or from about 10 microns to about 50 microns. With hydraulic shear in the drilling fluid, as experienced when the fluid exits the jets in the drill bit under pressure, the solids may be finely dispersed into the colloidal or sub-micron size range. The sized solids may be present in any suitable amount for a particular application. For example, the sized solids may be present in the stable emulsion drilling fluid in an amount in a range of about 1% to about 50% by weight of the stable emulsion drilling fluid. Alternatively, about 1% to about 10% by weight, about 10% to about 20% by weight, about 20% to about 30% by weight, about 30% to about 40% by weight, or about 40% to about 50% by weight.

The stable emulsion drilling fluids may additionally include drilling fluid additives, which may include viscosifiers, shale stabilizers, emulsifiers, wetting agents, weighting agents, etc. One should of ordinary skill, with the benefit of this disclosure, should be able to select additional drilling fluid additives for a particular application.

As will be appreciated by those of ordinary skill in the art, the combination of sized solid, biopolymer, and emulsifier may work synergistically to keep the stable emulsion drilling fluid from phase separating and stratifying. These results are further illustrated in the examples below. One of ordinary skill in the art would readily appreciate the applications of the drilling fluid disclosed here.

The disclosed stable emulsion drilling fluids may have particular advantages in drilling though certain subterranean formations such as salt domes. There may exist several challenges to drilling salt domes including wellbore erosion when drilling though the salt dome and/or though shales above or below the salt dome. Salt domes may also cause catastrophic drilling fluid loss which may prevent the use of an oil-based drilling fluid or a synthetic-based drilling fluids. Loss of fluid to the salt dome may prevent additional penetration as cuttings may not be effectively removed and excessive bit wear from inadequate cooling. Loss of drilling fluid may be expensive as additional drilling fluid must be provided to make up for the loss. In offshore applications in particular, additional drilling fluid may not be readily available. Additional challenges exist in deep wells where the hydrostatic pressure from the drilling fluid may become higher than the fracture gradient of a subterranean formation leading to pre-mature fracturing of subterranean formation. As will be appreciated by one of ordinary skill in the art, these and other challenges may be met by the stable emulsion drilling fluid described herein.

A method of extending a wellbore trough a formation, including salt domes, may include circulating a stable emulsion drilling fluid through a drill string and bottom hole assembly. The stable emulsion drilling fluid may transfer kinetic energy into a mud motor to drive a drill bit on the end of the bottom hole assembly thereby extending the wellbore. As previously mentioned, oil may be added to the stable emulsion drilling fluid to reduce the density. Oil may be added at any time, for example while the stable emulsion drilling fluid is being prepared or during the cleaning process after the stable emulsion drilling fluid has been circulated though the wellbore. In some examples, a density measurement tool may be provided that continuously or discretely monitors the density of the stable emulsion drilling fluid as it is returned to the surface. Suitable density measurement tools may include, but are not limited to, Coriolis meters, BaraLogix® density and rheology unit available from Halliburton Energy Services, Inc., and others. A user, such as a mud engineer, may make adjustments to the density of the stable emulsion drilling fluid based on the density of the stable emulsion drilling fluid returning to the surface. For example, should the density be too high for a particular application, the user may choose to add more oil to reduce the density of the fluid. Alternatively, should the density be too low, a user may choose to add more aqueous fluid to the stable emulsion drilling fluid. An automatic system may also be used to adjust the density of the stable emulsion drilling fluid according to this feedback loop and known density limits for select drilled formations.

As will be further described in the figure below, a stable emulsion drilling fluid may be generally cleaned and reused throughout a drilling operation. The stable emulsion drilling fluid may be cleaned of solids and drill cuttings and recycled back into the drill string. The additional oil or aqueous fluid required to adjust the density may be added at any time during the fluid handling process. For example, without limitation, the additional oil or aqueous fluid may be added in an inline mixer, to storage tanks including the stable emulsion drilling fluid, in the mud pit, or any other point in the fluid handling system.

Drilled solids which become entrained in the fluid may be removed by various means which are well known in the art. Shale shakers with select screen mesh sizes are often the most widely-used separation tools. These can be augmented with centrifuges having varying spool/bowl sizes and rotational speeds to further remove fine solids. Separation of solids by these means will allow for additional use of a given fluid, with lower requirements for liquid dilution to keep a constant density.

FIG. 1 illustrates an example drilling assembly 100 in which a stable emulsion drilling fluid 122 as disclosed above may be used. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118.

Stable emulsion drilling fluid 122 may be prepared. A pump 120 (e.g., a mud pump) may circulate stable emulsion drilling fluid 122 through a feed pipe 124 and to the kelly 110, which conveys the stable emulsion drilling fluid 122 downhole through the interior of the drill string 108 and through one or more orifices in the drill bit 114. The stable emulsion drilling fluid 122 may then be circulated back to the surface via an annulus 126 defined between the drill string 108 and the walls of the wellbore 116. At the surface, the recirculated or spent stable emulsion drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid. Specific sensors may include density sensing equipment.

After passing through the fluid processing unit(s) 128, a "cleaned" stable emulsion drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the stable emulsion drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the stable emulsion drilling fluid 122 at any other location in the drilling assembly 100. While FIG. 1 shows only a single retention pit 132, there could be more than one retention pit 132, such as multiple retention pits 132 in series. Moreover, the retention put 132 may be representative of one or more fluid storage facilities and/or units where the drilling fluid additives may be stored, reconditioned, and/or regulated until added to the stable emulsion drilling fluid 122.

Accordingly, systems and methods are provided for providing a stable emulsion drilling fluid. The systems and methods may include any of the various features of the systems and methods disclosed herein, including one or more of the following statements.

Statement 1. A method of extending a wellbore though a subterranean formation, the method comprising: providing a stable emulsion drilling fluid comprising: an aqueous liquid; a biopolymer; an emulsifier; solid particulates; and an oil; wherein the stable emulsion drilling fluid is an oil in water emulsion and is capable of remaining in quiescent storage at approximately 100° F. and atmospheric pressure with less than about 5% by volume phase separation for about 24 hours or longer; and circulating the stable emulsion drilling fluid though a drill string and bottom hole assembly.

Statement 2. The method of statement 1 wherein the aqueous fluid comprises a saturated brine.

Statement 3. The method of statement 1 or 2 wherein the biopolymer is selected from the group consisting of xanthan gum, welan gum, guar gum, hydroxyethyl cellulose, hydroxy-propyl guar, carboxy-methyl-hydroxy-propyl guar, starches and modified polysaccharides, (partially-hydrolyzed polyacrylamide) PHPA, diutan gum, scleroglucan, carboxy-methyl-cellulose, polyanionic cellulose, and combinations thereof.

Statement 4. The method of any preceding statement wherein the emulsifier is selected from the group consisting of fatty amines, ethoxylated nonylphenols, fatty acids, fatty acid esters, and combinations thereof.

Statement 5. The method of any preceding statement wherein the solid particles comprise a solid selected from the group consisting of sepiolite, attapulgite, calcium bentonite, sodium bentonite, calcium montromillonite, organoclays, and combinations thereof and wherein the sized solid particles have a mean particle size in a point ranging from 1 micron to 200 microns.

Statement 6. The method of any preceding statement wherein the oil is selected from the group consisting of alkanes, alkenes, alkynes, aromatics, a tall oil, crude oil, light cycle oil, synthetic ester oils, diesel, and combinations thereof.

Statement 7. The method of any preceding statement further comprising the steps of: circulating the stable emulsion drilling fluid to a drilling rig; monitoring a density of the stable emulsion drilling fluid; determining an additional volume of oil to add to the stable emulsion drilling fluid such that a target density of the stable emulsion drilling fluid is reached; adding the additional volume of oil to the stable emulsion drilling fluid to produce a reduced density stable emulsion drilling fluid; and circulating the reduced density stable emulsion drilling fluid through the drill string and the bottom hole assembly.

Statement 8. The method of any preceding statement wherein the target density is about 8 lb/gal to about 12 lb/gal.

Statement 9. The method of any preceding statement wherein the wellbore is extended through a salt dome, and wherein the aqueous liquid comprises a saturated brine, wherein the biopolymer is present in an amount ranging from about 0.5 wt. % to about 0.75 wt. % based on a total weight of the stable emulsion drilling fluid, wherein the surfactant comprises a fatty ester, wherein the surfactant is present in an amount ranging from about 1 wt. % to about 5 wt. % based on a total weight of the stable emulsion drilling fluid, wherein the sized solid particulates comprise sepiolite, wherein the sepiolite is present in an amount ranging from about 5 wt. % to about 10 wt. % based on a total weight of the stable emulsion drilling fluid, and wherein the oil is present in an amount ranging from about 1 wt. % to about 40 wt. % based on a total weight of the stable emulsion drilling fluid.

Statement 10. A method of reducing a density of a density of a stable emulsion drilling fluid comprising: providing a stable emulsion drilling fluid comprising: an aqueous liquid; a biopolymer; an emulsifier; solid particulates; and an oil; wherein the stable emulsion drilling fluid is capable of remaining in quiescent storage at approximately 100° F. and atmospheric pressure with less than about 5% by volume phase separation for about 24 hours or longer; circulating the stable emulsion drilling fluid though a drill string and annulus; adding additional oil to the stable emulsion drilling fluid to decrease the density of the stable emulsion drilling fluid and produce a reduced density stable emulsion drilling fluid; and circulating the reduced density stable emulsion drilling fluid though the drill string and the annulus.

Statement 11. The method of statement 10 wherein the aqueous liquid comprises a saturated brine.

Statement 12. The method of statement 10 or 11 wherein the biopolymer is selected from the group consisting of xanthan gum, welan gum, guar gum, hydroxyethyl cellulose, hydroxy-propyl guar, carboxy-methyl-hydroxy-propyl guar, starches and modified polysaccharides, (partially-hydrolyzed polyacrylamide) PHPA, diutan gum, scleroglucan, carboxy-methyl-cellulose, polyanionic cellulose, and combinations thereof.

Statement 13. The method of any preceding statement wherein the emulsifier is selected from the group consisting of fatty amines, ethoxylated nonylphenols, fatty acids, fatty acid esters, and combinations thereof.

Statement 14. The method of any preceding statement wherein the solid particles comprise a solid selected from the group consisting of sepiolite, attapulgite, calcium bentonite, sodium bentonite, calcium montromillonite, organoclays, and combinations thereof.

Statement 15. The method of any preceding statement wherein the solid particles have a mean particle size in a point ranging from 1 micron to 200 microns.

Statement 16. The method of any preceding statement wherein the oil is selected from the group consisting of alkanes, alkenes, alkynes, aromatics, a tall oil, crude oil, light cycle oil, synthetic ester oils, diesel, and combinations thereof.

Statement 17. The method of any preceding statement wherein the stable emulsion drilling fluid has a density of about 8 lb/gal to about 12 lb/gal.

Statement 18. A stable emulsion drilling fluid comprising: a saturated brine; a biopolymer wherein the biopolymer is present in an amount ranging from about 0.5 wt. % to about 0.75 wt. % based on a total weight of the stable emulsion drilling fluid; a surfactant comprising a fatty ester wherein the surfactant is present in an amount ranging from about 1 wt. % to about 5 wt. % based on a total weight of the stable emulsion drilling fluid; sepiolite wherein the sepiolite is present in an amount ranging from about 5 wt. % to about 10 wt. % based on a total weight of the stable emulsion drilling fluid; and an oil wherein the oil is present in an amount ranging from about 1 wt. % to about 40 wt. % based on a total weight of the stable emulsion drilling fluid.

Statement 19. The composition of statement 18 wherein the oil comprises diesel.

Statement 20. The composition of statement 18 or 19 wherein the stable emulsion drilling fluid is capable of remaining in a fluid state at approximately 100° F. and atmospheric pressure with less than about 5% by volume phase separation for about 24 hours or longer.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. The disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors (e.g., topside or downhole) used to drive the drilling fluids into motion, any valves or related joints used to regulate the pressure or flow rate of the drilling fluids, and any sensors (i.e., pressure and temperature), gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the disclosure, the following examples of certain aspects of some embodiments are given. In no way should the following examples be read to limit, or define, the entire scope of the embodiments.

Example 1

Three fluids were prepared according to Table 1 below. Each fluid was prepared with a saturated sodium chloride brine and 20 volume percent diesel. Fluid A was prepared with all three components sepiolite, bio-polymer, and emulsifier. Fluid B was prepared with bio-polymer and emulsifier. Fluid C was prepared with sepiolite and emulsifier. The fluids were allowed to rest in a static condition for 72 hours at ambient conditions. It was observed that fluid A did not exhibit phase separation. Fluid B exhibited phase separation with observable stratification and oil breakout on the surface of the fluid. Fluid C exhibited phase separation with stratification as the brine broke out of solution and settling at the bottom. All rheology data for the following examples is presented in lb/100 ft^2.

TABLE 1

| | Sample | | |
|---|---|---|---|
| Component | A | B | C |
| Sepiolite | X | | X |
| Bio-Polymer | X | X | |
| Emulsifier | X | X | X |

Example 2

Figure 2:
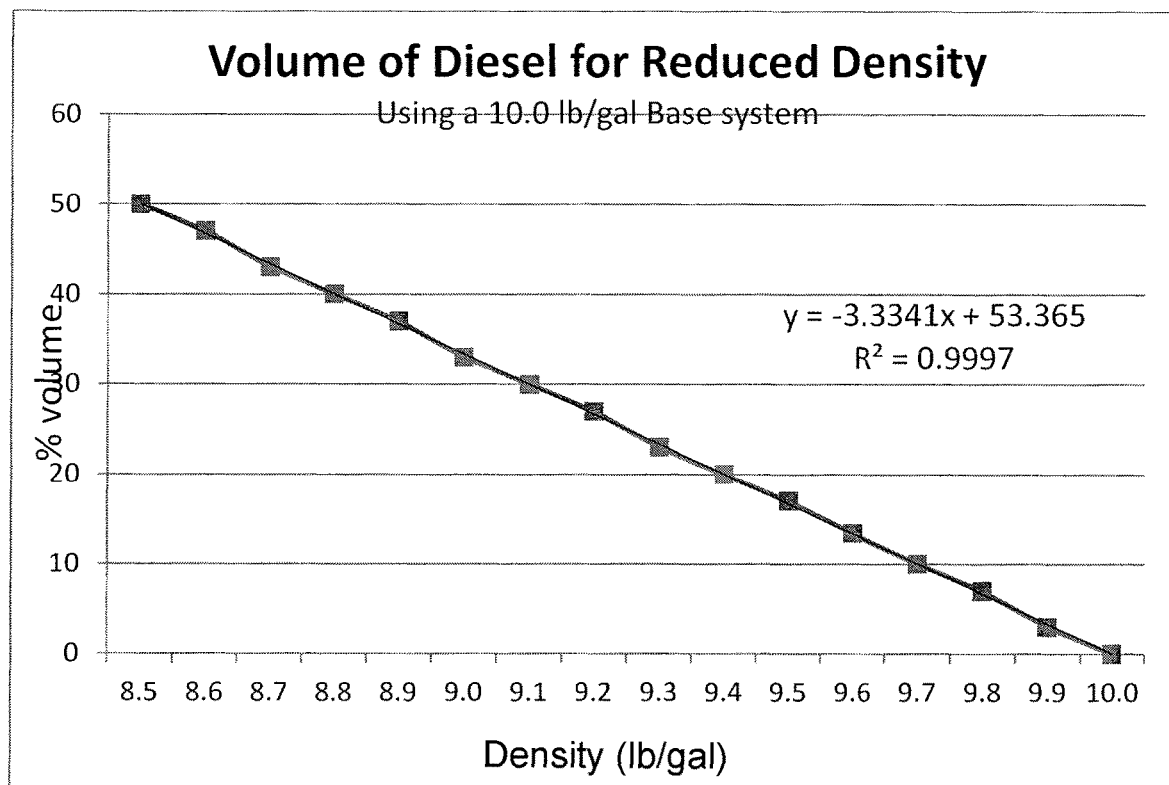
FIG. 2 is a graph depicting a density of a drilling fluid versus diesel volume in the fluid.

As previously discussed, the stable emulsion drilling fluid may have a variable density as needed for a particular application. A stable emulsion drilling fluid was prepared including sepiolite, bio-polymer, emulsifier, and a variable amount of diesel. The density at various volume percent diesel was measured and the data is presented in FIG. 2. It was observed that a higher concentration of diesel yielded lower density.

Example 3

Illustrative stable emulsion drilling fluids are presented in Table 2 in units of pounds per barrel (lb/bbl). Each of the illustrative stable emulsion drilling fluids was prepared and tested for stability. It was observed that sample D resisted brine breakout for several weeks, samples E and F were stable for about 24 hours. The compositions stable emulsion drilling fluids are merely representative of some drilling fluid compositions that may be used in certain drilling applications. The fluid compositions are non-limiting and one of ordinary skill in the art would appreciate that there may be modifications to the fluids that are within the spirit and scope of the disclosure. Illustrative rheology data for a particular drilling fluid is presented in Table 3 in units of centipoise.

TABLE 2

| Component | Sample D | Sample E | Sample F |
| --- | --- | --- | --- |
| Water | 251 | 251 | 251 |
| NaCl | 89.7 | 89.7 | 89.7 |
| Xanthan Gum | 0.75 | 0.75 | 0.75 |
| Emulsifier | 3.5 | 3.5 | 3.5 |
| Diesel | 56.3 | 56.3 | 56.3 |
| Sepiolite | 10 | | |
| Calcium Bentonite | | 10 | |
| Organoclay | | | 10 |
| Buffer | to pH 9 | to pH 9 | to pH 9 |

TABLE 3

| Rheology | |
| --- | --- |
| 600 | 32 |
| 300 | 21 |
| 200 | 16 |
| 100 | 11 |
| 6 | 3 |
| 3 | 2 |
| 10 sec | 3 |
| 10 min | 4 |
| PV | 11 |
| YP | 10 |

Example 4

Illustrative examples of stable emulsion drilling fluids are presented in Table 4. Samples were prepared, and the rheology was measured. Samples H and I were prepared using fresh water without added salt to test emulsion stability. It was observed that samples H and I were stable.

TABLE 4

| Component | G | H | I | J |
| --- | --- | --- | --- | --- |
| Fresh Water, lb/bbl | 147 | 235 | 165 | 201 |
| NaCl, lb/bbl | 52 | | | |
| CaCl2, lb/bbl | | | | 126 |
| Xanthan Gum, lb/bbl | 0.45 | 0.70 | 0.50 | 0.60 |
| Emulsifier, lb/bbl | 3.5 | 3.5 | 3.5 | 3.5 |
| Red #2, diesel lb/bbl | 148 | 90 | 148 | 88 |
| Sepiolite, lb/bbl | 10 | 10 | 10 | 10 |
| Ground Loenardite, lb/bbl | 2 | (2) | (2) | (2) |
| Mono ethanolamine, lb/bbl | 0.1 | 0.1 | 0.1 | 0.1 |
| Calculated Density, lb/gal | 8.63 | 8.11 | 7.85 | 10.26 |
| Brine | NaCl | Fresh | Fresh | CaCl2 |
| Brine volume, bbl | 0.47 | 0.67 | 0.47 | 0.68 |
| % base fluid, vol | 50 | 30 | 50 | 30 |
| Hot roll 150° F., hr | 16 | | | |
| Rheology, 120° F. | | | | |
| 600 rpm | 39 | 39 | 84 | 170 |
| 300 rpm | 20 | 29 | 65 | 115 |
| 200 rpm | 13 | 24 | 56 | 94 |
| 100 rpm | 8 | 18 | 43 | 69 |
| 6 rpm | 1 | 7 | 17 | 25 |
| 3 rpm | 1 | 5 | 14 | 20 |
| Gels, 10 s/10 m | 1/1 | 6/7 | 14/23 | 20/25 |
| PV | 19 | 10 | 19 | 55 |
| YP | 1 | 19 | 46 | 60 |

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method of extending a wellbore through a subterranean formation, the method comprising:
   providing a stable emulsion drilling fluid comprising:
      an aqueous liquid;
      a biopolymer;
      an emulsifier;
      solid particulates; and
      an oil;
   wherein a continuous phase of the stable emulsion drilling fluid comprises the aqueous liquid and a dispersed phase of the stable emulsion drilling fluid comprises the oil, and wherein the stable emulsion drilling fluid is capable of remaining in quiescent storage at approximately 100° F. and atmospheric pressure with less than about 5% by volume phase separation for about 24 hours or longer;
   circulating the stable emulsion drilling fluid to a drilling rig;
   monitoring a density of the stable emulsion drilling fluid;
   determining an additional volume of oil to add to the stable emulsion drilling fluid such that a target density of the stable emulsion drilling fluid is reached, wherein the target density is about 1% to about 30% lower than the density of the stable emulsion drilling fluid;
   adding the additional volume of oil to the stable emulsion drilling fluid to produce a reduced density stable emulsion drilling fluid; and
   circulating the reduced density stable emulsion drilling fluid though a drill string and a bottom hole assembly.

2. The method of claim 1 wherein the aqueous liquid comprises a saturated brine.

3. The method of claim 1 wherein the biopolymer is selected from the group consisting of xanthan gum, welan gum, guar gum, hydroxyethyl cellulose, hydroxy-propyl guar, carboxy-methyl-hydroxy-propyl guar, starches and modified polysaccharides, partially-hydrolyzed polyacrylamide, diutan gum, scleroglucan, carboxy-methyl-cellulose, polyanionic cellulose, and combinations thereof.

4. The method of claim 1 wherein the emulsifier is selected from the group consisting of fatty amines, ethoxylated nonylphenols, fatty acids, fatty acid esters, and combinations thereof.

5. The method of claim 1 wherein the solid particulates comprise a solid selected from the group consisting of sepiolite, attapulgite, calcium bentonite, sodium bentonite, calcium montmorillonite, organoclays, and combinations thereof and wherein the solid particles have a mean particle size in a point ranging from 1 micron to 200 microns.

6. The method of claim 1 wherein the oil is selected from the group consisting of alkanes, alkenes, alkynes, aromatics, a tall oil, crude oil, light cycle oil, synthetic ester oils, diesel, and combinations thereof.

7. The method of claim 1 wherein the target density is about 1% to about 30% lower than the density of the stable emulsion drilling fluid.

8. The method of claim 1 wherein the wellbore is extended through a salt dome, and wherein the aqueous liquid comprises a saturated brine, wherein the biopolymer is present in an amount ranging from about 0.5 wt. % to about 0.75 wt. % based on a total weight of the stable emulsion drilling fluid, wherein the surfactant comprises a fatty ester, wherein the surfactant is present in an amount ranging from about 1 wt. % to about 5 wt. % based on a total weight of the stable emulsion drilling fluid, wherein the solid particulates comprise sepiolite, wherein the sepiolite is present in an amount ranging from about 5 wt. % to about 10 wt. % based on a total weight of the stable emulsion drilling fluid, and wherein the oil is present in an amount ranging from about 1 wt. % to about 40 wt. % based on a total weight of the stable emulsion drilling fluid.

9. A method of extending a wellbore through a subterranean formation, the method comprising:
   providing a stable emulsion drilling fluid comprising:
      an aqueous liquid;
      a biopolymer;
      an emulsifier;
      solid particulates; and
      an oil;
   wherein a continuous phase of the stable emulsion drilling fluid comprises the aqueous liquid and a dispersed phase of the stable emulsion drilling fluid comprises the oil, and wherein the stable emulsion drilling fluid is capable of remaining in quiescent storage at approximately 100° F. and atmospheric pressure with less than about 5% by volume phase separation for about 24 hours or longer;
   circulating the stable emulsion drilling fluid though a drill string and a bottom hole assembly;
   monitoring a density of the stable emulsion drilling fluid;
   determining an additional volume of oil to add to the stable emulsion drilling fluid such that a target density of the stable emulsion drilling fluid is reached;
   adding the additional volume of oil to the stable emulsion drilling fluid to produce a reduced density stable emulsion drilling fluid; and
   circulating the reduced density stable emulsion drilling fluid through the drill string and the bottom hole assembly.

10. The method of claim 9 wherein the aqueous liquid comprises a saturated brine.

11. The method of claim 9 wherein the biopolymer comprises xanthan gum.

12. The method of claim 9 wherein the emulsifier comprises a fatty acid.

13. The method of claim 12 wherein the emulsifier has a Griffin's HLB (hydrophilic-lipophilic balance) of about 9 or greater.

14. The method of claim 9 wherein the solid particulates comprise sepiolite.

15. The method of claim 14 wherein the solid particulates have a mean particle size from 100 micron to 200 microns.

16. The method of claim 9 wherein the oil comprises diesel.

17. The method of claim 9 wherein the target density is about 8 lb/gal to about 12 lb/gal.

18. The method of claim 9 wherein the wellbore is extended through a salt dome, and wherein the aqueous liquid comprises a saturated brine, wherein the biopolymer is present in an amount ranging from about 0.5 wt. % to about 0.75 wt. % based on a total weight of the stable emulsion drilling fluid, wherein the surfactant comprises a fatty ester, wherein the surfactant is present in an amount ranging from about 1 wt. % to about 5 wt. % based on a total weight of the stable emulsion drilling fluid, wherein the solid particulates comprise sepiolite, wherein the sepiolite is present in an amount ranging from about 5 wt. % to about 10 wt. % based on a total weight of the stable emulsion drilling fluid, and wherein the oil is present in an amount ranging from about 1 wt. % to about 40 wt. % based on a total weight of the stable emulsion drilling fluid.

19. The method of claim 1 wherein the oil comprises diesel.

\* \* \* \* \*